(No Model.)

F. M. SPEED.
LAYING UNDERGROUND TELEGRAPH WIRES.

No. 286,861. Patented Oct. 16, 1883.

Fig. 1.
Fig. 2.
Fig. 3.

Witnesses:
L. B. Wight
K. Lockwood French

Inventor:
Francis M. Speed,
by his Attorney,
Frank L. Pope

UNITED STATES PATENT OFFICE.

FRANCIS M. SPEED, OF WALLA WALLA, WASHINGTON TERRITORY.

LAYING UNDERGROUND TELEGRAPH-WIRES.

SPECIFICATION forming part of Letters Patent No. 286,861, dated October 16, 1883.

Application filed June 30, 1882. (No model.)

*To all whom it may concern:*

Be it known that I, FRANCIS M. SPEED, a citizen of the United States, and a resident of Walla Walla, in the county of Walla Walla, Washington Territory, have invented certain new and useful Improvements in Underground Telegraphs, of which the following is a specification.

My invention relates to certain improvements in the construction of subterranean electric cables or conductors and in apparatus for laying the same.

Various plans have been proposed for insulating telegraphic and other conductors beneath the surface of the earth—such, for example, as inclosing within continuous metallic, wooden, or earthen tubes a series of insulated conductors, which are supported by means of insulating-blocks placed at suitable distances, or by laying them in grooved troughs or conduits constructed of insulating material. Another plan heretofore used consists in stretching the wires parallel with each other within a metallic or earthen conduit, the intervening spaces being then filled with asphalt or other suitable bituminous cement.

The object of my invention is to provide a convenient and inexpensive method of insulating and protecting subterranean conductors, together with apparatus or means for laying the same, whereby a conductor or group of conductors, whether previously insulated or uninsulated, may be placed beneath the surface of the earth, and perfectly insulated from each other and from the earth, at the same time receiving the requisite mechanical protection.

My invention consists in placing an electrical conductor or group of conductors within a suitable trench, and at the same time embedding said conductors at suitable distances apart within a continuous conduit of hydraulic or other cement or mortar while the same is in a plastic state. The material sets or becomes hard, and thus serves both to support and thoroughly insulate the conductors, while at the same time it resists the action of the moisture of the earth.

The invention also consists in improved machinery or apparatus for embedding the wires in the cement by a continuous process.

In the accompanying drawings, Figure 1 is a longitudinal section, showing a group of underground electric conductors embedded in a core of cement, together with the apparatus which I employ for laying the same. Fig. 2 is a front elevation of the same, partly in section; and Fig. 3 represents a cross-section of the conductors and insulating material when laid in the earth.

Referring to the drawings, A represents a trench of any required depth, which is excavated through the district where it is desired to lay the wires. At the bottom of this trench is placed the machine which I employ for laying and insulating the conductors. This machine consists of a movable carriage formed of a cylindrical tube, C, preferably rounding upward at its front end, as shown at $c$. A reel, E, is mounted upon the carriage C, upon which the electric conductors are coiled preparatory to laying. This reel may be of any suitable construction, but is preferably divided into sections, as shown at $e$, by suitable partitions, each section containing a separate coil of conducting-wire, which is unwound and supplied to the machine by its progressive forward motion, as hereinafter described.

From the central portion of the length of the carriage C extends a vertical pipe or tube, F, provided with a hopper, $f$, through which the insulating material is supplied to the apparatus. Within the tubular portion C is placed a movable cylindrical plunger, G, provided with suitable longitudinal perforations, through which the wires $c'$ from the reel E are respectively made to pass. The plunger G is capable of being moved forward and backward longitudinally within the tube C by means of a lever, H, which is pivoted at $h$ to the bracket $h'$, supported upon or attached to the upright pipe F. A transverse stop or bridge, I, is placed in the tube C, for limiting the forward movement of the plunger G, as well as for supporting and guiding the wires as they are fed from the reel. The stop or bridge I is perforated with holes corresponding in position to those of the plunger G, through which the wires from the reel E extend.

The operation of the machine is as follows: The respective wires, having been placed in separate coils upon the reel E, and their free ends threaded through the perforations in the bridge I and the plunger G, are secured in any suitable manner at that end of the trench at which the machine is placed and from which the wires are to be laid. The plunger G is thrown forward into the position shown in full lines in the drawings by means of its lever H, and the pipe F is filled with the mortar or cement in a plastic condition. This flows into the middle portion of the tube C and fills the entire space about the wires $e'$. The plunger G is next forced backward against the plastic mass of cement by means of its lever H. The movement of the plunger compresses the cement, causing it to be packed tightly about the wires, and afterward forces the machine itself forward in the trench, causing it to assume the position shown in the dotted lines in Fig. 1. The lever H is then again moved backward, carrying the plunger G into its advanced position, and the same operation is repeated. It is evident that at each backward movement of the plunger the cement will be somewhat compressed, and, in consequence of the resistance of the cylindrical conduit or core already formed, the machine itself will be driven forward, depositing the conduit in a continuous line at the bottom of the trench. In this manner a continuous solid conduit may be formed of any desired length, which soon hardens and forms an artificial stone. It may then be covered over with earth, thus entirely protecting the wires from moisture and securing a complete insulation between them.

In practice it is found desirable to construct the tube C of a slightly conical form, gradually increasing in diameter toward the end $c'$, for the purpose of lessening the friction between the cement and the tube as it is driven outward. The feeding-pipe F should also be made larger at its bottom than at the top, for the purpose of preventing the cement from clogging therein. The tube C should extend a sufficient distance behind the feeding-pipe F to support the cement until it hardens sufficiently to leave the tube and still preserve its form.

It may be found desirable, also, to employ a semicircular pipe or tube of earthenware or iron, as shown in dotted lines at A', Fig. 2, which pipe may be placed along the bottom of the trench to receive the conduit which is formed upon or within it in the manner set forth.

What I claim as my invention is—

1. The method, substantially as hereinbefore set forth, of laying and insulating electrical conductors, which consists in extending the conductors along the route of the line, in causing a die or molding-tube surrounding said conductors to travel continuously along them in a horizontal direction, and in simultaneously forcing plastic insulating material, under pressure, through said die or molding-tube, thus permanently embedding the conductors therein.

2. In an apparatus for laying underground conductors, the combination, substantially as hereinbefore set forth, of the longitudinal movable molding-tube, the vertical feeding pipe or hopper, the longitudinal perforated plunger, the lever for operating the same, and the perforated bridge for supporting and guiding the conductors.

3. The hereinbefore-described apparatus for laying and insulating underground electrical conductors, which consists in the combination of the longitudinally-movable molding-tube, the vertical feeding-pipe, the longitudinally-perforated plunger, the lever for operating the same, and the reel for holding the conductors.

In testimony whereof I have hereunto subscribed my name this 29th day of May, A. D. 1882.

FRANCIS M. SPEED.

Witnesses:
J. WM. L. HARVEY,
D. F. LEAHY.